United States Patent [19]
Restle et al.

[11] 3,990,635
[45] Nov. 9, 1976

[54] WINDOW MOUNTED SOLAR HEATING UNIT

[76] Inventors: Joseph W. Restle, 4630 N. 109th St.; Arthur J. Algaier, 3628 N. 101st St., both of Wauwatosa, Wis. 53225; George R. Krueger, 4120 N. 128th St., Brookfield, Wis. 53005

[22] Filed: Mar. 17, 1975

[21] Appl. No.: 559,256

[52] U.S. Cl. ............................... 237/1 A; 126/270; 236/49
[51] Int. Cl.² ........................................... F24J 3/02
[58] Field of Search ..................... 237/1 A; 126/270; 236/49

[56] References Cited
UNITED STATES PATENTS

| | | | |
|---|---|---|---|
| 246,626 | 9/1881 | Morse | 237/1 A X |
| 2,584,573 | 2/1952 | Gay | 237/1 A |
| 2,931,578 | 4/1960 | Thompson | 126/270 X |
| 3,288,206 | 11/1966 | Beeler | 165/39 |
| 3,863,621 | 2/1975 | Schoenfelder | 126/270 |

*Primary Examiner*—William E. Wayner
*Assistant Examiner*—William E. Tapolcai, Jr.

[57] ABSTRACT

Spaced apart overlying inner and outer transparent sheets extend across a window opening in an outside wall of a room, to define an air space having no communication with the outside but which space is communicable at its top and bottom with the room. The outwardly facing side of the inner sheet has dull infrared ray absorbing areas to abstract heat from sunlight entering the window and the inwardly facing side of the inner sheet has infrared ray reflecting areas. Thermostatically controlled valves at the top and bottom of said space, when opened in response to a temperature rise in said space, enable room air to circulate through the space and abstract heat therefrom.

24 Claims, 9 Drawing Figures

OUTWARDLY FACING SIDE

INWARDLY FACING SIDE

WINDOW MOUNTED SOLAR HEATING UNIT

This invention relates broadly to the utilization of solar energy, and refers more particularly to means for controlling the transmission of solar energy through windows in the outside walls of homes and of buildings in general.

It is well known that windows are notorious dissipators of much of the heat "poured" into homes and office buildings during the heating season in cold and even temperate climates. Studies made on the subject reveal that in conventional homes and buildings as much a forty-five precent (45%) of that heat is lost through the windows.

It follows, therefore, that if heat loss through windows could be eliminated — or at least significantly reduced — a substantial conservation of energy would result.

It is the purpose and object of this invention to provide a practical solution to the window heat-loss problem.

Another object of this invention is to eliminate the window heat-loss problem in a way which does not detract from the appearance of the window.

Another feature of the invention is its applicability to existing structures as well as to new construction.

Still another object of the invention is the provision of a window treatment that not only reduces heat-loss during the heating season — and, in fact, supplements the output of the heating plant through a novel way of utilzing solar energy — but is adaptable to prevent undesired transmission of solar energy into the home or office during hot weather.

Briefly summarizing the invention, it consists in providing what might be classified as a heat trap mounted in or across the window opening. This heat trap consists of overlying spaced apart inner and outer sheets of transparent material that are substantially coextensive in size and shape with the window opening and extend across the opening. The outer sheet is transparent, but the inner sheet is only partially transparent since one side thereof is treated to reflect heat energy, i.e. infra-red rays, while the other side has means thereon to absorb the infrared rays of solar energy.

For heat conservation during the heating season, the reflective side faces inwardly and the other side faces outwardly. Reversal of this relationship — by which the inner sheet becomes the outer sheet and its reflective surface faces outward — adapts the invention to use in hot weather when entry of solar energy through the windows is undesirable.

During the heating season when the infra-red ray absorbing surface faces outwardly, the heat energy trapped thereby heats the space between the inner and outer sheets, and — when the temperature therein reaches a predetermined level — thermostatically controlled valves open and communicate the space between the sheets at its top and bottom with the room interior. The above mentioned reversal of the sheets reduces the transmission of solar energy into the room. The invention thus has year-round utility.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of the embodiments of the invention constructed according to the best mode so far devised for the practical application of the principles thereof, and in which.

Figure 1:
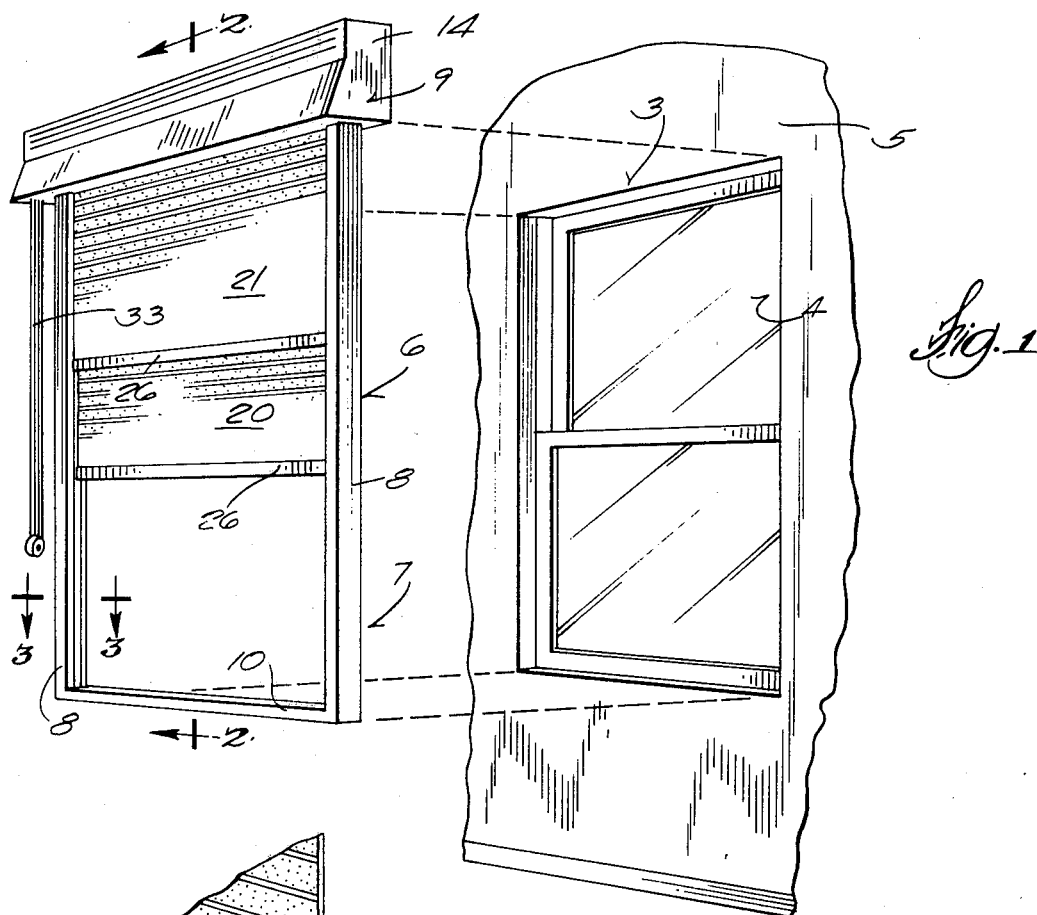
FIG. 1 is a perspective view illustrating a typical window and one embodiment of this invention, redy to be installed across the window.

Referring now to the accompanying drawings, and with reference first ot FIGS. 1–4, inclusive, the numeral 3 identifies a typical double-hung window mounted in the conventional way in a window opening 4 of an existing outside wall 5 of a room. In accordance with this invention. a unitary conversion unit — designated generally by the numeral 6 — upon being mounted on the wall 5, not only eliminates — or at least greatly minimizes heat loss through the window, but in addition uses solar energy to heat the room during the heating season.

The conversion unit 6 comprises a rectangular frame 7 of a size and shape to encompass the window opening and enable its attachment to the wall 5 on the inside surface thereof. The frame has upright side rails 8 and top and bottom cross bars 9 and 10, respectively. The side rails and the bottom crossbar are conveniently made of extruded aluminum tubing, though obviously the invention does not require that they should be. Preferably, the side rails and the bottom crossbar have substantially the same external cross sectional size and shape and their junctions are such that their front and back surfaces are flush.

Figure 2:
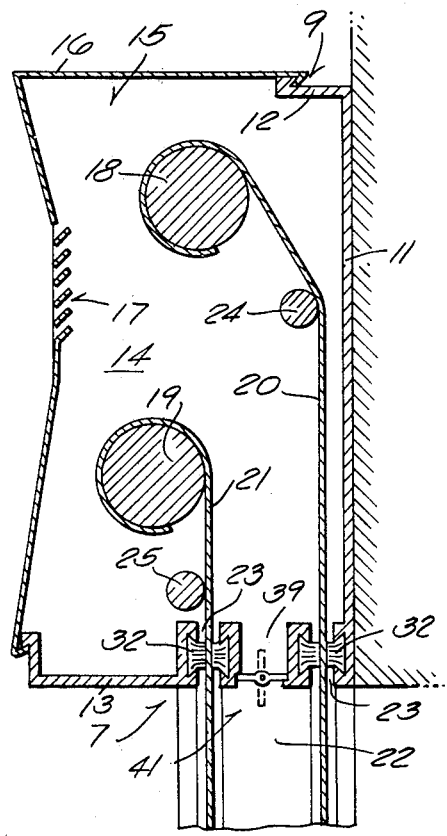
FIG. 2 is a vertical sectional view through FIG. 1 on the plane of the line 2—2.

The top cross bar is considerably larger in cross section than the side rails and bottom cross bar, and – as seen in FIG. 2 – it comprises a back wall 11 that is flush with the back surface of the side rails, top and bottom walls 12 and 13, respectively, and end walls 14. Together these walls define a box-like housing 15 that is completed by a stamped sheet metal valance 16 having louvers 17 through which the housing is communicated with the room interior. Mounted in the housing 15, one above the other, are two rollers 18 and 19. The ends of these rollers are journalled in bearings (not shown) that are fixed to the end walls 14, and hence the rollers extend across the full width of the frame 7.

Attached to the rollers 18 and 19 are outer and inner sheets 20 and 21, respectively, which — upon being pulled down in the manner of an ordinary window shade — form an air space 22 between them. Both sheets are made of transparent flexible material, preferably a plastic capable of withstanding sunlight.

The bottom wall 13 of the housing 15 has spaced parallel slots 23 through which the shade-like sheets pass, and to assure alignment of the sheets with these slots as the sheets are drawn from the rollers, guides 24 and 25 are provided. Obviously these guides span the distance between the end walls 14, and — if desired — could be freely rotatable.

The bottom edges of the inner and outer sheets are clamped between stiff metal bars 26, to the bottom of which sealing strips 27 are secured to seat upon the top wall 28 of the tubular cross bar 10 when the sheets are drawn all the way down.

Figure 3:
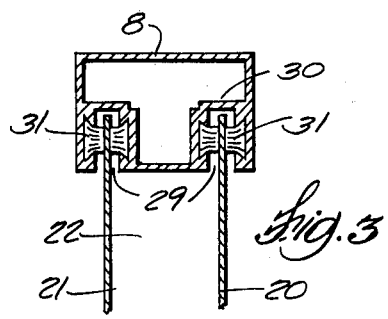
FIG. 3 is a horizontal sectional view through FIG. 1 on the plane of the line 3—3.

As shown in FIG. 3, the side edges of the sheets 20 and 21 are slidably received in channels 29 formed in the inner walls 30 of the tubular side rails 8; and since it is important to seal off undesired access to the space between the sheets 20–21, the mouths of the channels 29 are provided with seals 31 that snuggly, yet slidably, grip the marginal side edge portion of the sheets. Similar seals 32 are located in the slots 23 through which the sheets enter and leave the housing 15.

The rollers 18 and 19 may be equipped with conventional retraction springs, so that the sheets 20–21 can be drawn down from the rollers and rewound thereon like ordinary window shades, or the rollers can be freely rotatably mounted at both ends and rotated in both directions by chords 33.

Figure 4:
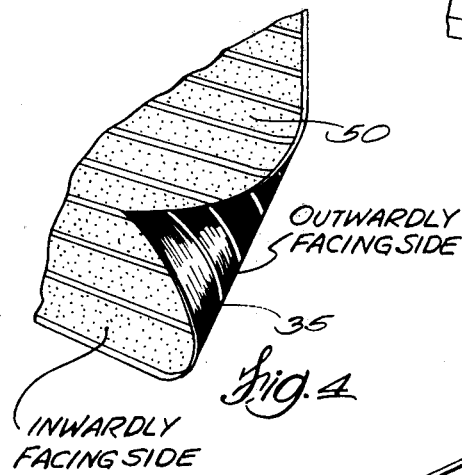
FIG. 4 illustrates both sides of an area of the inner sheet of that embodiment of the invention depicted in FIG. 1.

Since the primary objective of the invention is to utilize solar energy whenever possible and thereby conserve energy by reducing the load on the home heating plant, the outwardly facing side of the inner sheet 21 is provided with means to absorb the infrared rays of sunlight entering the window, and thereby heat the space between the sheets. There are obviously different ways in which that heat energy can be abstracted, one of which consists in coating selected areas of the outwardly facing side of the inner sheet with a dull dark or opaque coating composition that can be applied to the material of which the sheet is made. As shown in FIG. 4, the thus coated selected areas can be arranged in side-by-side stripes 35.

The effectiveness of the opaque areas to trap solar energy and heat the space between the sheets, necessarily depends upon the percentage of the total area of the inner sheet that is thus covered, but even if only as little as half of the area is "blacked out" a significant heat source results.

Obviously, of course, the opaque areas interfere with the view through the window, but that is a small price to pay for the saving in fuel costs made possible by this invention. Moreover, the opaque areas can be arranged in decorative patterns, which would give the window treatment an asthetically unique dimension.

But merely heating the space between the sheets is not enough. That heat must be delivered to the room. For that purpose the space between the sheets is controllably cummunicable at its top and bottom with the interior of the room so that room air can circulate through the space. To that end the hollow bottom cross bar 10 has an inlet opening 36 in its inside wall 37 through which air from the room can enter the cross bar, and an outlet opening 38 in its top wall 28 that leads to the space between the sheets; and the bottom wall 13 of the top cross bar has an elongated opening 39 through which air can pass from the space between the sheets into the housing 15 and from it through the louvers 17 into the room. Obviously, the openings 36, 38 and 39 could be provided by rows of individual holes.

Unless the temperature in the space between the sheets is higher than room temperature, the valves 40 and 41 that control communication between the room and, respectively, the bottom and top of the space between the sheets are closed. While these valves can take any desirable form, for purposes of illustration they are shown as dampers mounted in the housing 15 and the hollow bottom cross bar 10 for rotation about fixed axes between open and closed positions.

Figure 8:
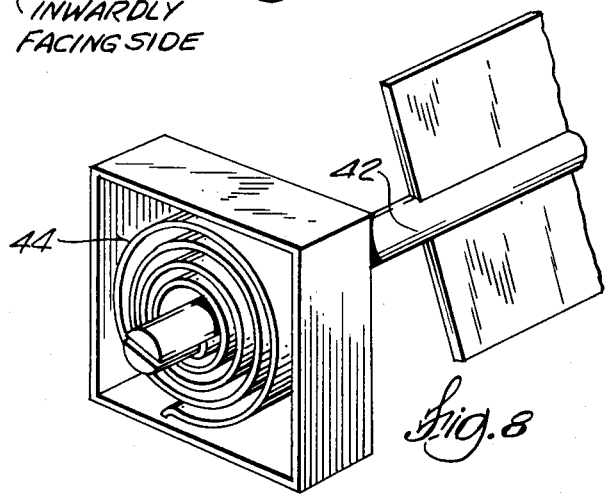
FIG. 8 is a perspective view of an end portion of one of the circulation controlling valves, illustrating — rather diagrammatically — one way of thermostatically actuating these valves.
Figure 9:
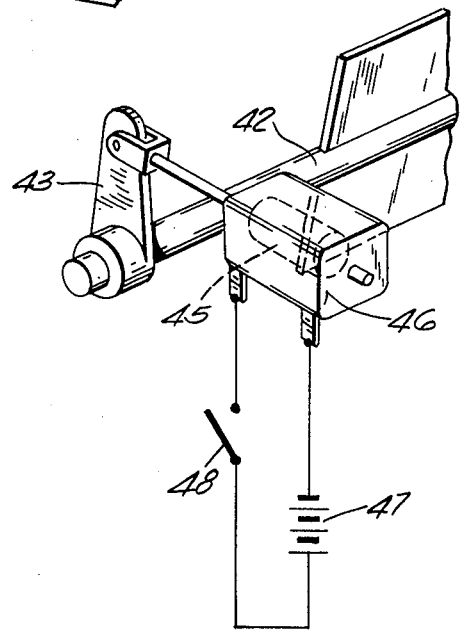
FIG. 9 is a view similar to FIG. 8, illustrating another way of thermostatically positioning the circulation controlling valves.

The valves 40 and 41 could be manually adjusted to their open positions whenever a thermometer having its sensor positioned to be influenced by temperature changes in the space between the sheets, indicates that the temperature of the space is above room temperature. Howevr, a more practical way of controlling the valves is by thermostatically acturated or governed automatic drive means. FIGS. 8 and 9 illustrate two ways in which this can be done.

In FIG. 8, the shaft 42 of the valve (damper) has the inner end of a curled bi-metal actuator 44 fixed thereto, the outer end of which is anchored. In practice, the valve actuators would be located in the housing 15 and the hollow bottom cross bar 10 where they would be responsive to temperature changes in the space between the sheets.

In FIG. 9, a lever 43 that is fixed to the shaft 42 is connected to an electric motor. As shown, this motor could be the armature 45 of an electromagnetic solenoid 46, energization of which by a voltage source 47 is controlled by a thermostat 48 located to be responsive to temperature changes in the space between the sheets.

In every case, therefore, communication between the room interior and the space between the sheets exists only when the temperature in the space exceeds a predetermined magnitude. At all other times, the valves are closed so that an insulating dead air space extends across the window to minimize heat loss. If desired, locking means may be provided to secure the valves closed.

While the provision of heat trapping opaque surface areas on the outwardly facing side of the inner sheet 21 alone effects a considerable saving in energy, even greater benefits are achieved by providing the inwardly facing side of the inner sheet with infrared ray reflecting areas 50. These areas reflect room heat away from the window and thereby significantly reduce heat loss at times when the temperature in the space between the sheets is below that at which the circulation controlling valves are open. That reflectancy can be obtained in any suitable way, one of which is described in the Lion U.S. Pat. No. 2,774,421; but where the means employed destroys the transparency of the sheet, only parts of its inner surface should be reflective, and those parts or areas should register with the opaque areas of the outwardly facing side of the sheet.

To adapt the unit for non-heating-season use, the sheets 20 and 21 are interchanged so that the transparent sheet 20 is innermost. For this purpose, the rollers 18 and 19 must be readily removable from their bearings. In addition, for non-heating-season use, the sheet 21 is reversed so that its reflective areas face outward to minimize the passage of infrared rays into the space between the sheets. With such interchange of the sheets and the reflective side of the sheet 21, much of the heat energy of sunlight striking the window is kept from entering the room, and — with the circulation controlling valves closed — the resulting dead air space between the sheets serves as a heat barrier across the window opening to further limit the passage of solar energy into the room.

One of the features of the just described embodiment of the invention (FIGS. 1–4) lies in the fact that it constitutes a unit complete in itself and easily applicable to an existing window by simply securing the frame of the unit to the inside wall. That securement can be effected in any conventional way, since the back of the entire frame is coplanar.

Another way of adapting the invention to an existing window structure is illustrated in FIG. t. A notable difference between this embodiment of the invention and that of FIGS. 1–4 is that it utilizes the existing glass windowpane 55 for the outer boundary of the space 56 which is heated by abstraction of solar energy. As illustrated, the pane 55 may be of the double-glazed variety of which there are several on the market - one of them being sold under the trademark "Thermopane". The inner boundary of the space 56 is provided by a pane 57 of glass or other suitable transparent material set into a frame 58 which, in turn, is removably mounted in the window opening inwardly of the existing window. From the standpoint of the invention, the panes 55 and 57 are the outer and inner transparent sheets 20 and 21 of the species of the invention illustrated in FIGS. 1–4; and it is to be understood that, in the claims, the term "sheet" — either in its singular or plural from — encompasses the panes 55 and 57 as well as the "storm window 66" which provides the outer boundary of the space in FIG. 7.

The outwardly facing side of the pane 57 has spaced apart areas thereof coated with a dull black or other dark or opaque coating composition, and its inwardly facing side is treated with a transparent reflective metallic oxide coating, which because of its transparency can cover the entire area of the pane 57.

The frame 58 is preferably made of extruded aluminum sections so secured together that the front and back faces of the frame lie in flat parallel planes. The hollow interiors of the top and bottom cross bars 59 and 60, respectively, are communicated with the space 56 and the room interior to enable room air to circulate through the space when the valves 61 and 62 are open. As in the previously described embodiment of the invention, the valves are open (during the heating season) only when the temperature in the space exceeds that of the room. As shown, the valves 61 and 62 are in the top and bottom cross bars to control communication between grilled openings 63 and 64 that respectively open to the room and to the space 56 between the existing windowpane 55 and the pane 57.

Figure 5:
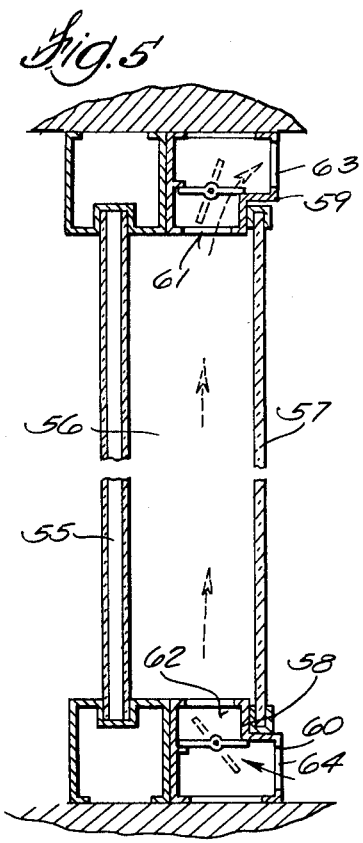
FIGS. 5, 6 and 7 are vertical sectional views through windows equipped with different embodiments of the invention.

Since the means for opening and closing the valves can be like that of either FIGS. 8 or 9, it has not been illustrated in FIG. 5.

The embodiment of the invention illustrated in FIG. 5 lends itself well to conversion from heating season use to non-heating season use. To make the conversion, it is only necessary to remove the frame 58 with the pane 57 in it, reverse the frame and then replace it — and, of course, "lock" the circulation controlling valves in their closed positions.

Figure 6:
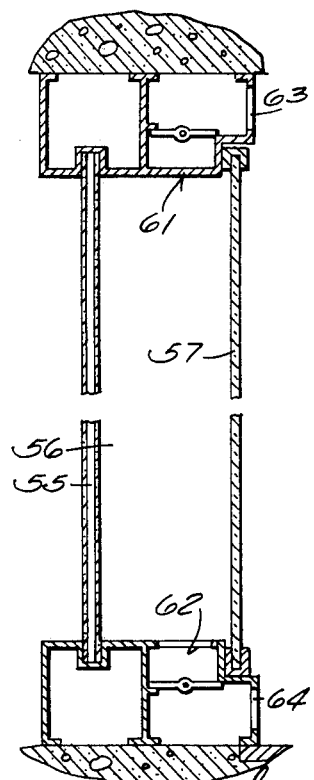
Figure 7:
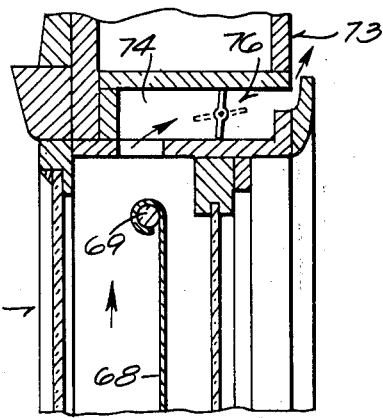
Figure 7:
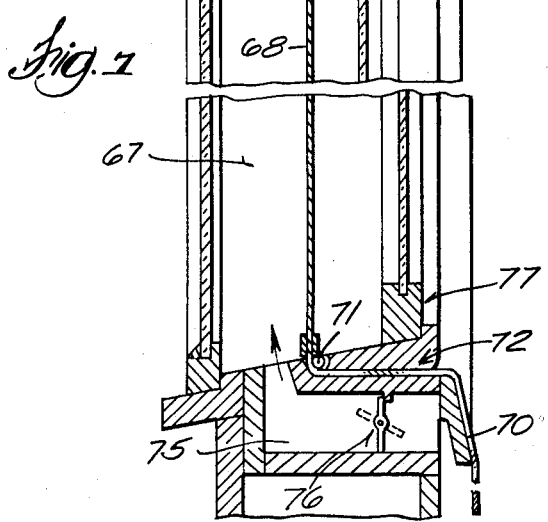

FIGS. 6 and 7 illustrate two ways of applying the invention to new construction.

The embodiment of the invention shown in FIG. 6 is essentially the same as that of FIG. 5, differing therefrom only in that the frame structure that removably receives the frame 58 of the inner pane is integral with that of the outer pane. Hence, the description of the structure shown in FIG. 5 will also suffice for FIG. 6.

FIG. 7, however, illustrates a substantially different approach in the adaptation of the invention to new structures. One of the features of this embodiment of the invention is its utilization of the customary storm window 66 to provide the outer boundary of the space 67 in which the heat source of the system is located. Since the inner boundary of that space is defined by a flexible transparent curtain 68 drawn from a spring-loaded roller 69 which may be located in the upper part of the window opening, as shown, or in the lower part of the opening, the space 67 is not sealed as well as it is in the other embodiments of the invention. Nevertheless, the advantages of the invention are achieved to a substantial degree with the arrangement shown in FIG. 7.

The curtain is drawn from the roller to overlie as much as possible of the area of the storm window. This can be done by a cord 70 connected to the free and of the curtain and passing around a pulley 71 and through an opening in the sill 72, or through the head 73 of the window frame if the roller 69 is mounted in the bottom portion of the window opening.

As in the previously described embodiments of the invention, the outwardly facing side of the curtain 68 which forms the inner boundary of the space 67, has dull black or other dark-colored stripes applied to it to absorb the infrared rays of the sunlight passing through the storm window, and the inwardly facing side of the curtain has a metallic reflecting composition applied to it in a manner which does not interfere too seriously with the transparency of the window.

Communication between the space 67 and the room is afforded by passageways 74 and 75 built into the head and sill of the window frame, and provided with thermostatically controlled damper-type valves 76 to enable the communication to be restricted to only that time of the day when the absorbed infrared rays heat the space 67 to a temperature in excess of that in the room.

It will be observed that the incorporation of the "heating unit" of this invention in the window installation does not interfere with the customary window sash 77, or with opening of the window in those seasons of the year when people enjoy letting in fresh air sans mosquitoes that are excluded by the substitution of a screen for the storm window. All that is needed to make this possible is to cause the spring loaded roller to retrieve the curtain.

But if the home is air conditioned, the curtain is reversed, so that its reflective side faces outward to minimize the transmission of solar energy into the room.

Those skilled in the art will appreciate that the invention can be embodied in forms other than as herein disclosed for purposes of illustration.

The invention is defined by the following claims:

1. Means for controlling the transmission of solar energy through a window opening in an outside wall of a room, said opening having top and bottom edges, comprising:

A. overlying spaced apart inner and outer parallel sheets of transparent material substantially coextensive in size and shape with the window opening;

B. means connecting the edges of said sheets with the boundaries of the window opening in a manner closing off the space between said sheets from the outside around the entire boundary of the window opening and from the room interior except at spaced apart upper and lower zones of the window opening whereby vertically spaced communication is possible between the room interior and said space to enable room air to be circulated through said space, said means so locating said sheets with respect to said outside wall that no portion thereof extends beyond the outer face of said outside wall;

C. means on the inner one of said parallel sheets to abstract heat from light rays entering said space through the outer transparent sheet and thereby heat the air in said space; and D. means for controlling circulation of room air through said space so that said circulation can be regulated to occur only when the temperature in said space reaches a predetermined magnitude.

2. The structure of claim 1, wherein said means for controlling communication of said space with the room interior comprises valve means movable between open and closed positions; and further characterized by motion producing means operatively connected with said valve means and operative when activated to move the valve means between open and close positions, said motion producing means being operable in accordance with temperature changes in said space.

3. The structure of claim 2, wherein said motion producing means is a bi-metallic activator located to be influenced by temperature changes in said space.

4. The structure of claim 2, wherein said motion producing means comprises an electric motor, a voltage source and circuit means to connect the motor with the voltage source, the circuit means including a thermostatic switch located to be responsive to changes in the temperature in said space.

5. The structure of claim 2, wherein there is one said valve means adjacent each said spaced apart upper and lower zones of the window opening so that when said valve means are in their closed positions a dead air space exists between the overlying transparent sheets.

6. The structure of claim 1, wherein said heat abstracting means comprises at least one dark-colored area on the outwardly facing surface of the inner transparent sheet.

7. The structure of claim 6, wherein there are more than one dark-colored area on the inner transparent sheet.

8. The structure of claim 7, wherein said dark-colored areas are substantially uniformly distributed across the entire inner transparent sheet.

9. The structure of claim 6, wherein said dark-colored areas are so spaced as not to detract from the transparency of a selected area of said inner sheet.

10. The structure of claim 7, further characterized by spaced apart infrared ray reflecting areas on the inwardly facing surface of the inner transparent sheet.

11. The structure of claim 10, wherein said infrared ray reflecting areas and said dark-colored areas are substantially coextensive in area and distribution so that they are aligned with one another at opposite sides of the inner transparent sheet.

12. The structure of claim 5, wherein said heat abstracting means comprises spaced apart dark-colored areas on the outwardly facing surface of the inner transparent sheet.

13. The structure of claim 12, wherein said dark-colored areas are substantially uniformly distributed across the entire inner transparent sheet.

14. The structure of claim 13, further characterized by spaced apart infrared ray reflecting areas on the inwardly facing surface of the inner transparent sheet.

15. The structure of claim 14, wherein said infrared ray reflecting areas and said dark-colored areas are substantially coextensive in area and distribution so that they are aligned with one another at opposite sides of the inner transparent sheet.

16. The structure of claim 5, wherein the inner one of said spaced apart sheets has infra-red ray reflecting means on one side thereof and infrared ray absorbing means on its other side so that when the latter side faces outwardly the infra-red ray absorbing means constitutes the heat abstracting means of paragraph C in claim 1; and further characterized in that said means for connecting the edges of the overlying spaced apart transparent sheets with the boundaries of the window opening enables the inner one of said sheets to be turned inside out so that the reflective areas face outwardly to diminish tjhe passage of solar energy into the room.

17. The structure of claim 1, wherein the means by which the edges of said sheets are connected with the top and bottom boundaries of the window opening comprise ducts that extend along the said top and bottom boundaries of the window opening, each of said ducts having an air opening that leads to the space between said spaced apart transparent sheets and another opening that leads to the room interior so that said ducts provide for said vertically spaced communication between the room interior and said space between the sheets, and wherein said means for controlling circulation of room air through said space comprises a valve in each of said ducts between its said openings, and means for opening and closing said valves.

18. The structure of claim 17, further characterized by means responsive to changes in the temperature in said space operatively connected with said valves to automatically open the same when the temperature in said space reaches said predetermined magnitude.

19. The structure of claim 1, wherein at least the inner one of said transparent sheets is a flexible curtain on a roller located at either the top or bottom boundary of the window opening.

20. The structure of claim 1, wherein said transparent sheets are panes of glass, and wherein said means for connecting the edges of said transparent sheets with the boundaries of the window opening comprises a frame in which said panes of glass are mounted.

21. The structure of claim 1, wherein the outer one of said overlying transparent sheets is formed of glass and is permanently mounted in the window opening.

22. The structure of claim 21, wherein the inner one of said overlying transparent sheets is mounted in a frame detachably secured to the boundaries of the window opening and constituting part of said means for connecting the edges of said transparent sheets with the boundaries of the window opening.

23. The structure of claim 10, wherein the outer one of said overlying transparent sheets is the storm window of a conventional window, wherein the inner one of said overlying transparent sheets is a flexible curtain located between the storm window and the regular window sash; and wherein upon reversal of the curtain the space between the curtain and the regular window sash forms a heat barrier to minimize transmission into the room of any heat that the light reflecting areas on the then outwardly facing side of the curtain do not keep from passing through the curtain.

24. The structure of claim 10, wherein each of said sheets is a flexible curtain on a roller located at either the top or bottom boundary of the window opening; and wherein said rollers are detachably mounted so that the curtains can be interchanged to make the sheet with the dark-colored areas on one side and the reflecting areas on the other side the outermost sheet, and also enable said then outermost sheet to be reversed so that its reflecting side faces outward.

* * * * *